Patented June 7, 1932

1,862,060

UNITED STATES PATENT OFFICE

FRANZ RUDOLF MOSER AND JACQUES GREUTERT, OF AMSTERDAM, THE NETHERLANDS, ASSIGNORS, BY MESNE ASSIGNMENTS, TO SHELL DEVELOPMENT COMPANY, OF SAN FRANCISCO, CALIFORNIA, A CORPORATION OF DELAWARE

TREATMENT OF PETROLEUM ACID SLUDGES

No Drawing.   Application filed August 8, 1928. Serial No. 298,396.

This invention relates to the treating of acid sludges obtained from the sulfuric acid treatment of petroleum oils, and it is an object of the invention to provide a method whereby these acid sludges may be neutralized and converted into valuable products.

The invention further relates to the production of artificial asphalt-like products from petroleum acid sludges.

Further objects and advantages of this invention will appear from the following description in which we have set forth a preferred method of our invention. It is to be understood that the appended claim is to be accorded the scope and range of equivalents consistent with the state of the prior art.

In the treatment of petroleum oils with sulfuric acid for purification and refining, an acid sludge is formed, consisting of a more or less viscous, black mass, containing a certain amount of free sulfuric acid, and further the products of reaction of the acid treatment as organic acids, sulfonated substances and others. This acid sludge is a difficult article to handle because of its high acidity, and the great quantities produced, as nearly all petroleum products handled in a refinery need acid treatments. Its disposal forms one of the most difficult problems of petroleum technology, and has never satisfactorily been solved.

One way of disposing of the sludge has been to burn it, and special installations have been built only for the purpose of destroying the sludge. Other refineries have installed special systems to burn the sludge as fuel, in order not entirely to waste it; however this requires an expensive installation as the high acidity of the sludge makes it extremely corrosive, and during incomplete combustion, especially on starting or shutting down, acid vapors escape which seriously attack boilers and flues.

Another way to dispose of the sludge is to recover the free acid contained in the sludge, often as much as 30% or more, and special separating and concentrating plants are in use for this purpose. This involves the careful washing of the sludge to dissolve the free acid out of it, with water or steam, and subsequent concentration of the dilute acid recovered. The cost of these treatments often is more than the value of the acid recovered, but the tarry residue left is so far reduced in acidity that it is not especially harmful and can be disposed of more easily. It proved, however, that the acid sludges obtained from certain oils present great difficulties in concentrating, and in such case further special treatments are required to accomplish the concentration.

The disposal of the acid sludges in the different ways mentioned always involves a loss and the material is entirely or to a great extent wasted. Further these treatments can be used only with great difficulty on acid sludge obtained from the treatment of lubricating oils, as this sludge forms a highly viscous mass which hardly can be pumped.

It also has been attempted to convert the acid sludge itself into a useful product by heating it sufficiently so that the acid components are reduced and driven off as sulfur dioxide.

It was found, however, that coke formation took place in the sludge to such extent, that the greater part of the sludge was converted into coke, and only a small part could be used though a substantial part of the acid was recovered in the form of sulfur dioxide. Other methods of reducing the acid sludge to a neutral product have been tried, by means of reducing agents, as sulfur or hydrogen sulfide, but the same difficulty of coke formation made these methods also impracticable.

We have found that if acid sludge is heated in the presence of a suitable diluent, this coke formation does not occur, the acid bodies are decomposed and the entire residue after removal of the reaction gases is recovered as a neutral or nearly neutral product, resembling more or less blown asphalt. As suitable diluents for the practice of our invention we have found that we can use most petroleum oils and asphalts, heavier than gas oil and tar-products; lighter fractions will not prevent the coke formation.

After the destruction of the acidity of the sludge most of the acid can be recovered as sulfur dioxide, and the oily residue is completely or substantially neutralized, resulting in a homogeneous product, which resembles blown asphalt closely enough to be used as such. It also can be used as fuel oil, being fully soluble in ordinary fuel oils, which the acid sludge is not. Our invention converts in a very simple and economical way the objectionable acid sludge into useful products, with only slight losses in material.

Our treatment is particularly applicable to acid sludge obtained from lubricating oils, as this sludge is the most difficult to handle, and a sludge of this type will be considered in the following description of a preferred method of operating our invention.

The sludge resulting from the treatment of a heavy lubricating oil distillate with concentrated acid, a very viscous black material, containing between 20 and 35% free acid is mixed with an equal quantity of heavy neutral petroleum asphalt. Preferably this mixing is done by first heating the diluent to about 100° C., and then adding the acid sludge slowly, or in several dumps, under continuous agitation. The mixture is then further heated under agitation. Soon a strong reaction with foaming and gas formation starts. The heating under agitation is continued until a temperature between 120 and 250° C. is reached, preferably not over 250° C., and the mixture is kept at this temperature for some hours until the reaction is completed, as shown by the cessation of the evolution of gaseous reaction products as steam, hydrogen sulfide, sulfur dioxide, etc.

The resultant product is neutral or nearly so, dependent on the time and completeness of the reaction; after two hours of heating often a slight acidity is left, though not over 2%; after five hours the product usually is entirely neutral. It has the appearance and properties of blown asphalts, and is apparently homogeneous; the melting point depends entirely on the characteristics of the sludge and of the diluent. The product is soluble in asphalts and in fuel oils. For use as asphalt it is desirable to carry the process to complete neutralization.

In the application of our invention described here we used equal quantities of diluent and sludge as it was desired to obtain a product with not too high a melting point; for the prevention of coke formation a much smaller amount of diluent is usually sufficient. The characteristics of the diluent to be preferred depend in each case on the finished product desired; if this is to be used as asphalt, a heavy asphalt will be preferable as diluent; if it is to be used as fuel oil, a residual fuel oil may be used.

It will be understood that the same treatment may be applied to other acid sludges than those from the treatment of lubricating oil, with necessary variations in time of heating, temperature, diluent, etc. As mentioned before, even for sludges from the treatment of light oils the diluent has to be a rather heavy petroleum product, and preferably an asphaltic product.

From the above the advantages of our treatment will be clear. It avoids the cumbersome washing of the sludge for the recovery of acid, no material is lost by coke formation, no special installations are necessary to use the untreated corrosive sludge as fuel.

We claim as our invention:

The process of converting acid sludge resulting from the treatment of lubricating oil with sulfuric acid, into a homogeneous neutral asphalt like product, consisting of: heating a petroleum asphalt to a temperature not under 120° C. adding under agitation about an equal amount of acid sludge, further slowly heating the mixture under agitation to a temperature not over 250° C. continuing the heating for a time sufficient to cause substantially complete decomposition of the acid compounds of the sludge, while removing the gaseous reaction products.

In testimony whereof, we have hereunto set our hands.

FRANZ RUDOLF MOSER.
JACQUES GREUTERT.